Feb. 11, 1936. W. C. STARKEY 2,030,333
CLUTCH SPRING
Original Filed Jan. 7, 1931

Inventor:
William C. Starkey,
By: Arthur Wm Nelson
Atty.

UNITED STATES PATENT OFFICE 2,030,333

CLUTCH SPRING

William C. Starkey, Indianapolis, Ind., assignor, by mesne assignments, to William C. Starkey, Indianapolis, Ind., Raymond S. Pruitt and Walter H. Beal, Chicago, Ill., trustees Original application January 7, 1931, Serial No. 507,062. Divided and this application March 21, 1932, Serial No. 600,139

10 Claims. (Cl. 192—107)

This invention relates to improvements in clutch springs, and it consists of the matters hereinafter described and more particularly pointed out in the appended claims.

The present application is a divisional one, as the subject matter herein was first presented in my copending application, Serial Number 507,062, filed January 7th, 1931 (now Patent No. 1,953,370, dated April 3, 1934.).

The spring embodying my invention is of especial advantage in that type of clutch embodying two coaxial, cup-shaped members, adapted to receive a helical spring, which in response to relative rotation of said members in one direction, freely permits such rotation but which in response to rotation of said members in the other direction acts to clutch said members together for conjoint rotation.

The primary object of the invention is to provide a spring for use in a clutch of this kind, wherein the end turns or coils at the unanchored end of the spring assume only a small percentage of the load to be held and each consecutive turn or coil toward the middle of the spring assumes a successively greater percentage of said load until that turn or coil is reached which crosses the plane of the meeting ends of the cup-shaped members and which turn or coil assumes the entire load.

Another object of the invention is to provide a spring for the purpose mentioned which is easy to make and although it is made of stock of the same cross sectional area throughout its length, is rendered more flexible at one end by the provision of a plurality of axially extending gradient grooves in several of the turns or coils at said end of the spring.

The above mentioned objects of the invention as well as others, together with the many advantages thereof, will more fully appear as I proceed with my specification.

In the drawing:—

The improved clutch spring is herein illustrated and will be herein described, as embodied in the pinion unit of an engine starter but this is to be considered as illustrative only, of one of the many uses for such a spring, because as will be apparent, the improved spring may also be used in clutches for other purposes when the peculiar characteristics of the spring make it of advantage to do so.

In general, the improved spring is wound in the usual manner from a length of spring stock having the same cross sectional area throughout its entire length and one end of said length of stock is bent axially to provide a toe at one end of the spring while the other end of the spring is ground flat. The spring is thereafter ground peripherally to provide the desired gripping surface for the spring. Preferably before such grinding is performed, a plurality of arcuately spaced, longitudinally extending gradient grooves are produced in that end of the spring opposite its toed end with the deepest end of the grooves at the extremity of the spring. Thus the turn at said end of the spring is the most flexible and this flexibility decreases in the successive turns or coils until that turn or coil, having the shallowest end of the grooves, is reached.

Figure 1:
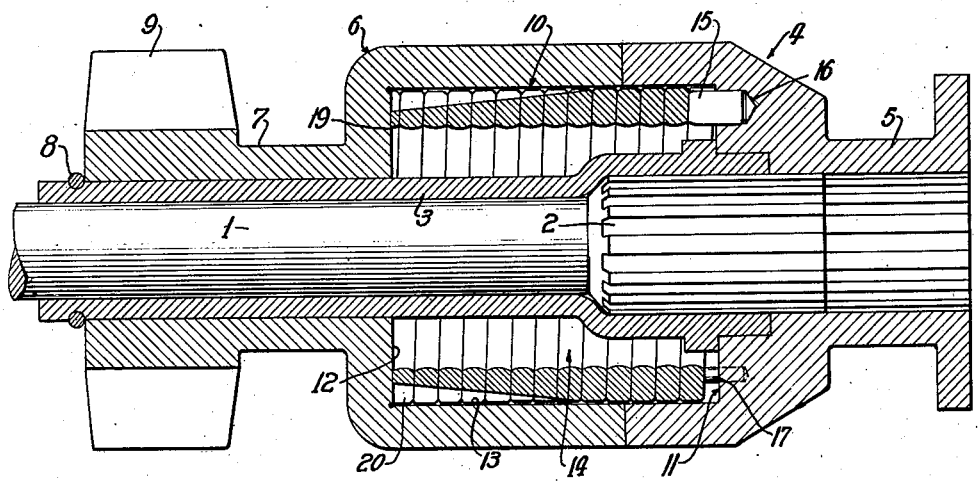
Fig. 1 is a longitudinal vertical sectional view through a spring clutch embodying the preferred form of spring made in accordance with my invention.
Figure 2:
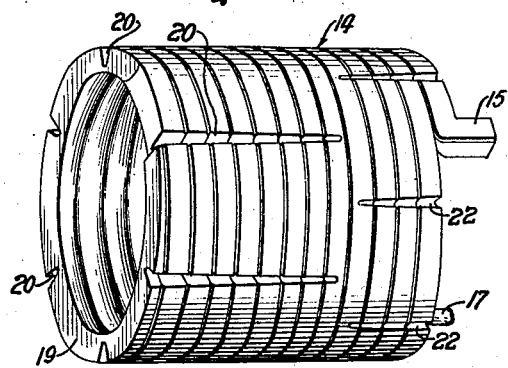
Fig. 2 is a perspective view of the preferred form of clutch spring embodying my invention.

Referring now in detail to that embodiment of the invention, illustrated in Figs. 1 and 2 of the accompanying drawing:—1 indicates as a whole the driven shaft of an automobile or like engine starting motor, having a splined part 2 of enlarged diameter at that end remote from said motor. On said shaft is mounted a bearing sleeve or bushing 3. A cup-shaped clutch member 4 is provided at one end with a hub 5 having a splined connection with the like part 2 of the shaft 1.

A second clutch member 6 has a hub 7 at one end that is journalled on the sleeve 3 and is held against endwise movement in one direction thereon by a spring retaining ring 8 suitably engaged in an annular groove in said sleeve. On said hub is formed the pinion 9 which in an endwise movement of both cup-shaped members toward the starting motor is adapted to be moved into engagement with the fly wheel ring gear (not shown) of the engine to be started.

Both cup-shaped members are formed at their abutting ends to provide a clutch spring recess 10 having flat ends 11 and 12 respectively and an annular clutch surface 13.

In said recess is located a clutch spring 14 embodying the preferred form of my invention. Said spring is of an external diameter when in its normal unstressed condition, approximating that of the surface 13. That turn or coil of the spring associated with the end 11 of the recess is turned axially to form a toe 15 adapted for engagement in a pocket 16 formed in the member 4 and opening through the flat end of said recess. Preferably this turn or coil of the spring is also provided with one or more axially extending studs 17 adapted for contact against the surface of the flat end 11 to squarely support the end of said spring.

That turn or coil 19 at the other end of the spring is ground flat for engagement with the end 12 of the recess and is devoid of any toe or studs such as are associated with the first mentioned end of the spring.

In the second mentioned end of the spring which is in fact the energizing end thereof, I provide in one surface of the spring, a plurality of longitudinally or axially extending gradient grooves 20. Said grooves are deepest at that end opening through the turn or coil 19 and gradually decrease in depth toward the middle turn or coil of the spring. Preferably these grooves terminate short of the plane of the meeting ends of the two cup-shaped members 4 and 6 as best shown in Fig. 1 and preferably these grooves are in the external surface of the spring because of the ease in which they can there be produced.

As shown herein, I provide six of such grooves spaced equal arcuate distances apart. Thus with such a spring, the endmost turn or coil 19 is relatively speaking, the most flexible one of the spring and this flexibility decreases in the successive turns or coils until that turn or coil having the shallowest end of the grooves therein is reached.

As said grooves become more and more shallow the various turns retain greater percentage of their total rigid strength until where the grooves run out or disappear, the turns or coils retain their full strength and rigidity.

During relative rotation of the cup members 4 and 6 in one direction, as when the member 4 is being driven by the shaft 1 in the proper direction, said member will through the toe 15 tend to turn the spring in a direction to unwind the same.

As the opposite end of the spring is the most flexible one because of the arrangement of the grooves as before described, it is apparent that the turn or coil at said end will be the first one to be effected thereby and radially expand and then the next one and so on until all of those turns or coils having portions of the grooves therein will be expanded into engagement with that part of the surface 13 near said end 12. Thus the turn or coil 19 will assume only a small part or percentage of the total load and each successive turn or coil will assume a successively greater part of the load until that coil is reached which crosses the plane of the meeting ends of the cup-members wherein said total load is assumed.

Thus in the spring structure mentioned the slots have in no manner decreased the total load value of the spring because the end turn or coil 19 from a standpoint of proper functioning would not need a cross sectional area such as in that turn which crosses said plane of the meeting ends of the cup members to retain the full capacity of the spring.

Again, this end of the spring with its flexibility has another advantage in that only a light overrun or frictional drag is had and this would still be true even though the end turn or coil be several thousandths of an inch oversize with respect to the diameter of the recess 10.

Figure 3:
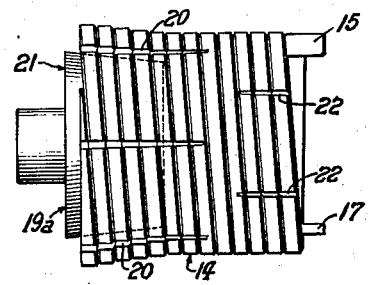
Fig. 3 is a view in side elevation of a slightly modified form of clutch spring embodying my invention.

Instead of the spring being of the same diameter from end to end as shown in Figs. 1 and 2, the unanchored end may be of a different diameter, either smaller or larger than the remainder of the spring and yet have the light overrunning characteristics desired. In Fig. 3 is shown a spring wherein the endmost turn or coil 19a is several thousandths of an inch larger than those at the other end which are made of a diameter approximating that of the recess. Thus the endmost turn or coil 19a may be .015" greater than that of the recess in which it is used, the next turn being .010" over recess size and the third turn or coil being .005" over recess size.

This relative diameter of the turns or coils at the unanchored end of the spring with respect to the recess diameter may be secured in two different ways. In the case of the spring shown in Fig. 3, these turns or coils at the unanchored end may be made by actually expanding them simply by driving a taper mandrel 21 thereinto until these turns or coils take on a permanent set.

Figure 4:
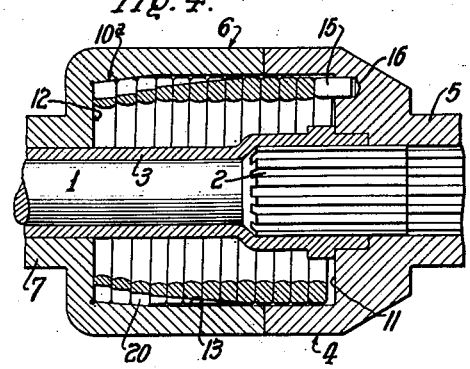
Fig. 4 is a fragmentary longitudinal sectional view through a modified form of spring clutch in which my improved clutch spring is readily usable.

Again, the same result may be obtained by leaving the spring perfectly cylindrical on its external surface and by tapering one end of the recess as at 10a in Fig. 4.

In grinding flat that end of the spring shown in Figs. 1 and 2, embodying the turn 19, said turn presents but a narrow contact surface for engagement with the cylindrical wall of the recess near the associated end which insures cutting through the lubricant film on the end surface 12 of the recess to make a better metal-to-metal contact between said end turn or coil and said end surface, and makes positive a better grip for said end when the spring is rotated in the proper direction.

Again, these grooves have other advantages as they offer space into which the film of lubricant which is wiped off the surface 13 can enter when the spring is approaching its full locking or clutching condition. Also the relatively sharp edges of the grooves present a series of scraping edges that cut the film of oil from the cylindrical pockets, thus leaving a metal-to-metal condition or engagement of spring and recess, which insures a high coefficient of friction and a more positive locking effort.

As is shown in Fig. 2, similar slots 22 may be formed in the anchored end of the spring and these slots terminate short of the turn that would cross the plane of the meeting ends of the cup members 4 and 6. These slots are disposed in the external surface of the spring, in planes between those of the slots 20 and at their deepest part would be only about one half the depth of said slots 20 and would taper out to nothing at their other ends.

This would cause the anchored end turn or coil to be slightly more resilient but would not detract from its compression strength and would insure its coming into positive intimate contact with the end of the recess so that these three or more turns in a shallow recess, will quickly and efficiently assume a locking position and help take the stress off the toe 15.

Again, these grooves provide more space to receive the lubricant which is wiped off the surface 13 as the spring starts to assume its locking condition or position.

By reason of the slots in the free or energizing end of the spring, the rigid or stiff condition not desired at this end of the spring when the turns or coils are made of substantially large cross sectional stock, is changed to one of the desired flexibility for the intended purpose.

Heretofore, in a spring without such a flexible end, it was not practical to have the same more than .003" or .004" over that of the diameter of that part of the recess engaged thereby in the case of overrunning clutches because of great overrun friction. On the other hand, with this end of the spring, but a few thousandths oversize, said limited oversize and relatively heavy toe pressure due to the stiffness of the spring would quickly wear down this end of the spring through overrunning friction in a relative movement between the cup members in the proper direction.

In making the spring described, modern spring making practice is followed. Thus the spring may be made of stock of uniform cross section, wound and ground in the usual manner after which it is grooved exteriorly as shown.

While in describing the invention, I have referred in detail to the form, arrangement and construction of the parts thereof, the same is to be considered as illustrative only, so that I do not wish to be limited thereto except as may be specifically set forth in the appended claims.

I claim as my invention:—

1. As a new article of manufacture, a clutch spring embodying a plurality of coils and having one of the peripheries thereof ground to form a clutching surface, certain of the coils being axially grooved in the portions thereof which form the clutching surface in order to make them more flexible than the other coils of the spring and to receive lubricant removed from the surface with which said clutching surface is adapted to coact in response to a change in the diameter of the spring.

2. As a new article of manufacture, a clutch spring embodying a plurality of coils and having one of the peripheries thereof ground to form a clutching surface, the coils at one end of said spring being axially grooved in the portions thereof which define said clutching surface in order to make them more flexible than the coils at the other end of the spring and to receive lubricant removed from the surface with which said clutching surface is adapted to coact in response to a change in diameter of the spring.

3. As a new article of manufacture, a clutch spring embodying a plurality of abutting coils of the same cross sectional area and having one of the peripheries thereof ground to form a clutching surface, certain of the coils being axially grooved in the portions thereof which define said clutching surface in order to make them more flexible than other coils of the spring and to receive lubricant removed from the surface with which said clutching surface is adapted to coact in response to a change in the diameter of the spring.

4. As a new article of manufacture, a clutch spring embodying a plurality of coils of the same cross sectional area and having the outer periphery thereof ground to form a clutching surface, the coils at one end of said spring being axially grooved in the portions thereof which define said clutching surface in order to make them more flexible than the coils at the other end of the spring and to receive lubricant removed from the surface with which said clutching surface is adapted to coact in response to expansion of the spring.

5. As a new article of manufacture, a clutch spring embodying a plurality of abutting coils and having one of the peripheries thereof ground to form a clutching surface, the end coil at one end of the spring being formed to provide anchorage means for the spring and the end coil at the other end of the spring being ground flat and having together with the other coils at said other end of the spring axially extending grooves in the surfaces thereof which define the clutching surface in order to increase the flexibility thereof over the coils at said one end of the spring, and to receive lubricant removed from the surface with which said clutching surface is adapted to coact in response to a change in the diameter of the spring.

6. As a new article of manufacture, a clutch spring embodying a plurality of coils and having the outer periphery thereof ground to form a cylindrical clutching surface, the coils at one end of the spring being provided in the outer portions thereof with axially extending grooves which decrease in depth from the outer to the inner ends thereof and serve to render the coils in which they are formed more flexible than the other coils of the spring and to receive lubricant removed from the surface with which said clutching surface is adapted to coact in response to expansion of the spring.

7. As a new article of manufacture, a clutch spring embodying a plurality of abutting coils and having one of the peripheries thereof ground to form a substantially cylindrical clutch surface, the coils at one end of the spring having axial grooves in the clutch surface forming portions thereof which decrease in depth and taper from the outer to the inner ends thereof and operate to increase the flexibility of the coils in which they are formed over the other coils of the spring and to receive lubricant from the surface with which the clutching surface is adapted to coact in response to a change in diameter of the spring.

8. As a new article of manufacture, a clutch spring embodying a plurality of abutting coils of uniform diameter and the same cross sectional area having the outer periphery thereof ground to form a cylindrical clutching surface, the coils at one end of the spring having axially extending grooves in the outer portions thereof which taper and decrease in depth from the outer to the inner ends thereof and operate to make the coils in which they are formed more flexible than the other coils of the spring and to receive lubricant removed from the surface with which the clutching surface is adapted to coact in response to expansion of the spring.

9. A clutch spring embodying therein a plurality of coils made of stock of the same cross sectional area, said spring having a ground cylindrical gripping surface, certain of the coils having axially extending gradient grooves in said gripping surface to make said certain coils more flexible than the other coils of the spring.

10. A clutch spring embodying therein a plurality of coils made of stock of the same cross sectional area, said spring having a ground external, cylindrical gripping surface, certain of the coils at an end of the spring having axially extending gradient grooves in one end of said gripping surface to make said certain coils more flexible than the other coils of the spring.

WILLIAM C. STARKEY.